Aug. 9, 1938.  H. F. VON THÜNGEN  2,126,157
MEASURING SYSTEM FOR DETERMINING THE EFFICIENCY OF ROTARY
MOTION TRANSMITTING DEVICES BY COMPARING TORQUES
Filed Sept. 12, 1936  2 Sheets-Sheet 1

Inventor
Hubert Freiherr von Thüngen

By Edmund H. Perry Jr.
Attorney

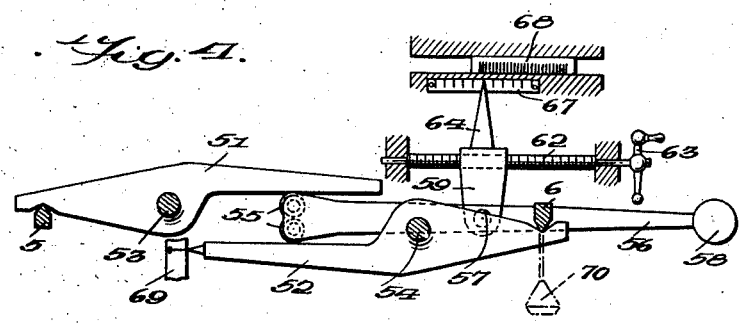
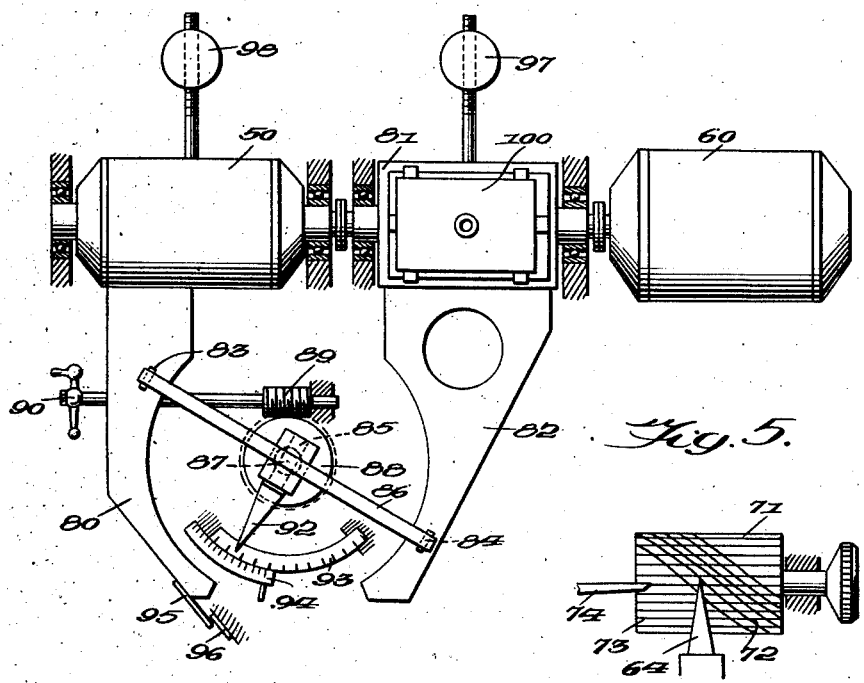

Patented Aug. 9, 1938

2,126,157

UNITED STATES PATENT OFFICE 2,126,157

MEASURING SYSTEM FOR DETERMINING THE EFFICIENCY OF ROTARY MOTION TRANSMITTING DEVICES BY COMPARING TORQUES

Hubert Freiherr von Thüngen, Friedrichshafen, Germany, assignor to Zahnradfabrik Friedrichshafen Aktiengesellschaft, Friedrichshafen, Germany Application September 12, 1936, Serial No. 100,552
In Germany September 13, 1935

21 Claims. (Cl. 73—51)

This invention is directed to the determination of the efficiency of rotary motion transmitting devices, or drivers, such as speed changing gearing. It is desirable in many instances to ascertain losses occurring in drives, and it is the essential purpose of the present invention to provide a practical system for readily and accurately determining the extent of such losses. The proposed system may be readily adjusted to any speed ratio and may be employed to determine the efficiency of variable speed drives for each speed selection.

The invention depends upon a comparison of rotary moments, or torques. There are three such factors available for measuring purposes, these being: the input torque applied to the input shaft of the transmission drive, the output torque developed by the output shaft of the drive, and the counter-torque (also to be referred to as output torque) of the housing of the drive. Two of these factors suffice for determining the efficiency.

Except for the entirely unreliable determination of the efficiency of gearing by measuring the heat loss, efficiency up to the present time has been determined by separately measuring and later comparing two of the above three rotary moments. The latter method is inaccurate since an error may be made in making each of the two measurements, and the separate measurements can not be made at the same time.

The present invention is far superior and more accurate in that according to the new method the several torques employed in the measurement act simultaneously and are directly compared. Arrangement may be made so that only a single measuring reading need be taken, and this can be done on an indicator calibrated to directly indicate the efficiency of the drive under test. The indicator may read in terms of torque loss, or, preferably, can be marked to read percentage efficiency.

A torque trasmitting and comparing system is employed upon which the two torques involved in the measurement act in common and at the same time, and in which the torques as transmitted can be brought to balance. Arrangement is made to adjust the torque transmission ratio of the system to conform to the particular transmission (speed) ratio of the drive being tested and the torque loss may thus be directly given as a resultant according to the extent of unbalance of the lever system for the particular speed ratio.

A lever system, for example, may be employed, and by several different expedients its effective lever ratio may be varied to produce equilibrium. The deviation of the lever ratio from the theoretically correct ratio for the prevailing transmission in the drive under test will indicate the torque loss and give a direct measurement of the efficiency of the drive which can be read off on a graduated scale.

If measuring receptacles, spring scales or the like are interposed in the lever system the absolute moments are easily determined therewith. The torque loss may be determined through adjustment of the lever ratio, by changing the lever fulcrums or by adding weights to the lever system, which will establish equilibrium for the particular drive ratio.

The constant indication of the prevailing efficiency can be obtained by providing electrical, hydraulic or other means for automatically rebalancing the lever system in the event of even the slightest deviation from its equilibrium condition.

The several torques employed in the measurement may be transmitted to the measuring system mechanically, for example, through transmission levers, traction means or the like, or hydraulically.

Several embodiments of a measuring system according to the invention are shown in the drawings, lever systems being employed in each instance. In such drawings:

Fig. 1 is an elevation of one embodiment of the invention with certain parts shown in section;

Fig. 2 is a corresponding top plan view;

Fig. 3 is an enlarged view of certain of the details shown in Fig. 1;

Fig. 4 is an elevation of a second embodiment of the invention;

Fig. 5 shows a special type of indicating means which may be quickly set for various gear ratios; and Fig. 6 is a top plan view of a third embodiment of the invention.

In the embodiment of Figs. 1 and 2 the drive to be tested is diagrammatically indicated by the numeral 100. Its input driving shaft is connected to a testing motor 50 and its output shaft is acted upon by a suitable braking device 60 which may be of the type employed in dynamometers. The casing of the test drive should be supported in fixed position, but as shown the motor and brake are each journaled on bearings in suitable supports so that their casings are freely rotatable. The casings of the motor and brake are provided respectively with arms 5 and 6. The arm 5 of the motor will give the input torque on the drive being tested while the arm 6 of the brake will give the output torque. In the present embodiment the counter-torque of the drive casing is not employed and, as stated, such casing is secured against rotation.

The measuring system includes two double levers 1 and 2 arranged scale-beam-like, the adjacent ends of which are supported by the respective knife edges 8 and 7 of a free fulcrum member 10. Lever 1 rests at its one end on the fulcrum member and at its other end is acted on from below by the torque lever 5 on the motor casing. Balance lever 2 bears from below at one end on the fulcrum member and at its other end is acted upon from above by torque lever 6 of the brake. Roller 3 is journaled between balance lever 1 and adjustable block 13 on screw spindle 10, and roller 4 is similarly journaled between lever 2 and block 12 on screw spindle 9. Rotation of the screw spindles moves blocks 12 and 13, which are supported through rollers 11 on suitable fixed frame parts 14, and through this arrangement the transmission ratio of the levers may be varied.

An indicator lever 15 pivotal on a stationary pin 16 is actuatable by the block 12 when the latter is moved through its spindle 9. The free end of the indicator lever moves over a graduated scale 17. The scale is graduated in terms of speed ratios, and by adjusting spindle 9 by means of crank 26 the lever system can be set for the transmission ratio of the gearing being tested. It will be observed that the immediate effect of the adjustment is to shift the position of roller 4, which constitutes an adjustable fulcrum on which lever 2 is supported.

A second indicating arm 19 supported on a fixed pivot 18 is arranged to be adjusted over a scale 20 through block 13 upon adjustment of screw spindle 10 by means of crank 27. Movement of the block 13 shifts the position of roller 3 against which lever 1 is held by the knife edge 8 and through arm 5. Scale 20 is calibrated to directly read off the degree of efficiency of the test drive.

Block 12 of lever 2 is provided with a support 24 in which is journaled a counter-weight 22 which bears against the upper side of lever 2 above roller 4. Spindle block 13, as best shown in Figs. 2 and 3, is provided with oppositely extending arms 25 pivoted to the block at a point above roller 3 which carry at their ends counterweights 23 which bear against the upper surface of lever 1 at equal distances from roller 3. Counter-weights 22 and 23 are movable with their respective blocks and their common center of gravity is opposite the center of gravity of levers 1 and 2 relative to the fulcrum points 3 and 4.

The equilibrium position of the lever system is indicated by a stationary zero mark 21 opposite which a pointer 31 on the outer end of lever 1 must stand. Adjustment of the system into its equilibrium position will be made through operation of screw spindle 10 which serves to shift the position of roller 3 which acts as a fulcrum for lever 1. Turning of the spindle may be done manually through crank 27. Automatic means may be provided for this purpose by providing a pair of opposing electrical contacts 30 on opposite sides of lever arm 1 and connecting the contacts in the circuit of an electric motor 32 which, through gears 33 and 34, will rotate the spindle. Whenever the lever system is out of balance the motor circuit will be completed through one or the other of the contacts and adjustment will be made until the equilibrium system is in balance.

The manipulation and operation of the measuring system is as follows: The system is set for the prevailing transmission ratio of the drive 100 by rotating screw spindle 9 to bring pointer 15 to the proper ratio as indicated by scale 17. The system is then brought to equilibrium by adjustment of spindle 10. If the drive being tested has 100 per cent efficiency, the torques exerted by arms 5 and 6 on the respective levers, under compensation made for the particular speed ratio, should produce equilibrium when pointer 19 is brought to the middle point of scale 20. Losses occurring in the drive cause a disturbance in the equilibrium position which will throw the indicator 31 off zero mark 21. Spindle 10 must be adjusted, either manually or automatically as described, until equilibrium is again established and this will cause a shift of pointer 19. The magnitude of movement of block 13 by the spindle necessary to establish equilibrium will measure the efficiency of the drive by direct reading on scale 20.

To determine the absolute torque of the drive being tested a hydraulic measuring device may be disposed at a fulcrum point of the system, for example, in place of the fulcrum member 7, 8.

To determine the absolute torque loss in the drive, the lever system will first be adjusted through spindle 9 for the proper transmission ratio. Instead of adjusting spindle 10 to bring about equilibrium, a pan 37 may be provided in which weights may be placed. Wherever there is a loss in the drive, the torque arm 6 on brake 60 connecting with the output end of the drive will be insufficient to balance the force exerted by arm 5 on the driving motor 50. Hence, by disposing the weighing pan to act on lever 2 at the same point as does torque arm 6, the force exerted by the latter will be supplemented by the weights to effect a balance of the system. The torque loss, or deficiency can be determined by the weight necessary to add.

A somewhat different measuring system is shown in Fig. 4 for use with the same set-up of the test drive, driving motor and brake as shown in Fig. 2. Such embodiment is simpler in that there is only one adjusting spindle. Scale-beam-like double levers 51 and 52 are respectively supported on stationary pivot pins 53 and 54. Torque arm 5 of the motor will act on the outer end of lever 51, and torque arm 6 of the brake will act on the outer end of lever 52.

The inner end of lever 52 has an indicating pointer which may be caused to stand opposite the zero mark 69 when the system is in equilibrium.

A third lever 56 is provided at one end with rollers 55 engageable with the opposing surfaces of levers 51 and 52 and at its other end with a counterweight 58. Lever 56 is suspended through a pivot pin 57 on a sliding block 59 which can be adjustably journaled by means of a screw spindle 62. By adjustment of crank 63 lever 56 will be shifted lengthwise to change the point of contact of rollers 55 relative to levers 51 and 52.

Block 59 is provided with a pointer 64 which, as crank 63 is adjusted, moves along a stationary scale 67. Scale 67 is calibrated to give the equilibrium positions for different transmission ratios of the drive being tested at 100 per cent efficiency. A second scale 68 is provided adjacent scale 67 and is adjustable relative thereto. Scale 68 will indicate the prevailing efficiency for a particular transmission ratio. For each transmission ratio of the drive a corresponding efficiency scale must be inserted. With 100 per cent efficiency for a particular transmission ratio being indicated by scale 67, the extent of movement of pointer 64 to establish equilibrium of the system will show on scale 68, and the actual efficiency can be read directly off therefrom.

Where it is desired to determine the absolute torque loss a measuring pan 70 may supplement the action of torque arm 6 of the brake on lever 52.

Instead of employing fixed scale 67 with interchangeable efficiency scales 68, use can be made of a drum 71, as shown in Fig. 5, having on its jacket a series of efficiency lines 72, and a second series of lines 73 for different transmission ratios. The drum may be rotated until the proper transmission ratio line 73 stands opposite a stationary mark 74. The position of pointer 64 of the lever system will move across the different efficiency lines when the lever system is adjusted to balance and the degree of efficiency can thus be determined.

The embodiment of the invention shown in Fig. 6 makes use of a different two torque factors than the other constructions, and necessitates a different set-up of the drive to be tested. In this case the efficiency is determined by a comparison of the initial, or input torque and the counter-torque of the drive being tested.

The drive motor 50 is again journaled to be freely rotatable and is provided with a specially formed arm 80. Brake 60 is fixed against rotation. The drive 100 to be tested is mounted in a frame 81 which is journaled to be freely rotatable. Fixed to the frame is a special arm 82, similar and complementary to arm 80. Arms 80 and 82 are counter-balanced by counter-weights 98 and 97 on motor 50 and the drive supporting frame 81.

Positioned above arms 80 and 82 is a lever 86 rotatable about a vertical pivot pin 87 and journaled to swing on a horizontal axis 85. The opposite ends of lever 86 are provided with rollers 83 and 84 which respectively engage arms 80 and 82.

Lever 86 is adapted to be swung on its vertical axis 87 by a worm gear 88, worm 89 and hand crank 90. The swinging magnitude is indicated by a pointer 92 on a stationary scale 93 which is graduated for different transmission ratios. A second scale is provided to indicate efficiency, a different scale being used for each transmission ratio.

Mounted on arm 80 is a pointer 95 which is to be set by adjustment of the system opposite a stationary zero mark 96 to bring the system into equilibrium. The torques exerted by arms 80 and 82 act against each other through lever 86 by reason of the horizontal lever pivot 85. Rotation of lever 86 on its vertical pivot 87 shifts the points of contact of the lever with the respective arms 80 and 82 in opposite directions to change the effective distances relative to the axis of the motor and test drive so as to vary the effective forces exerted by arms 80 and 82 on the lever.

Under such arrangement tne system is first brought into a theoretical state of balance for 100 per cent efficiency by rotating lever 86 through the crank until pointer 92 is opposite the prevailing transmission ratio of the drive as indicated on scale 93. Further adjustment of lever 86 through the crank necessary to bring about the actual state of balance will cause the pointer 92 to deviate, and such deviation will be shown on scale 94, and the actual efficiency directly read off of the latter.

From the several embodiments herein described it will be seen that the invention provides a method of accurately determining the power losses in a gearing through a comparison of two of the three available torque factors. The several torques selected for measurement are caused to act against each other within the proposed system. Extreme accuracy of measurements is obtainable since by a comparison of the torques by the system itself a single reading only is required, and this may be obtained directly from a scale calibrated in terms of efficiency. The invention is adapted to make compensation between the several torque factors for the actual transmission ratio at the time of the test, and arrangement is made whereby the system can readily be adjusted to give the efficiency over a range of transmission ratios. A change speed gearing may quickly be tested for all of its transmission ratios. Further, as explained in connection with the illustrative systems of the invention, arrangement may be made according to the invention to determine absolute torques and torque losses in addition to the measurement of efficiency. The use of torque factors according to the invention provides a means for accurately determining power losses as long, of course, as the input of the motor to the drive being tested remains constant.

I claim:

1. A system for testing rotary motion transmitting devices comprising a testing motor and a brake mechanism between which the rotary motion transmitting device under test is to be connected, separate means for simultaneously transmitting the torque applied to the device and the consequential torque developed by the device, and balance means for comparing said torques.

2. A system for testing rotary motion transmitting devices comprising a testing motor and a brake mechanism between which the rotary motion transmitting device under test is to be connected, separate means for simultaneously transmitting the torque applied to the device and the consequential torque developed by the device, balance means for comparing said torques, and means for adjusting the balance means to vary the effective ratio of the torques.

3. A system for testing rotary motion transmitting devices comprising a testing motor and a brake mechanism between which the rotary motion transmitting device under test is to be connected, separate means for simultaneously transmitting the torque applied to the device and the consequential torque developed by the device, balance means for comparing the torques transmitted, and means for adjusting the balance means for different input-output speed ratios.

4. A system for testing rotary motion transmitting devices comprising a testing motor and a brake mechanism between which the rotary motion transmitting device under test is to be connected, separate means for simultaneously transmitting the torque applied to the device and the consequential torque developed by the device, balance means for comparing the torques transmitted with each other, means for adjusting the balance to vary the effective ratio of the torques, and means indicating when the balance means is in a state of balance.

5. A system for testing rotary motion transmitting devices comprising a testing motor and a brake mechanism between which the rotary motion transmitting device under test is to be connected, separate means for simultaneously transmitting the torque applied to the device and the consequential torque developed by the device, balance means for comparing the torques transmitted with each other, means for adjusting the balance to vary the effective ratio of the torques, means indicating when the balance means is in a state of balance, and indicating means actuatable by the balance means and responsive to the difference between the opposing torques for indicating the loss occurring in the device under test.

6. Apparatus for testing rotary motion transmitting devices including means for transmitting the torque input to the device under test, means for transmitting the consequential torque developed by the device, balance means upon which the torques transmitted act simultaneously and in opposition, means for adjusting the balance means to vary the effective ratio of the torques, and means actuatable by the balance means and responsive to the difference between the opposing torques for the prevailing speed ratio of the device under test for indicating the loss occurring in the device under test.

7. Apparatus for testing rotary motion transmitting devices including means for transmitting the torque input to the device under test, means for transmitting the consequential torque developed by the device, balance means upon which the torques transmitted act simultaneously and in opposition, means for adjusting the balance means to conform to the prevailing speed ratio of the device under test and means for bringing the torques into equilibrium, and means actuatable by the balance means and responsive to differences between the torques under adjustment of balance means for the prevailing speed ratio of the device for indicating the loss occurring in the device under test.

8. Apparatus for testing rotary motion transmitting devices comprising a leverage system upon which the torque input to the device under test and the consequential torque developed by the device are caused to act in opposition, means for varying the effective leverage of the system, means for indicating the correct point of balance of the leverage system for the prevailing speed ratio of the device under test, an indicator actuatable by the leverage system measuring the difference between the correct point of balance and the point of actual balance when the torques are adjusted to act in equilibrium.

9. Apparatus for testing rotary motion transmitting devices comprising a leverage system upon which the torque input to the device under test and the consequential torque developed by the device are caused to act in opposition, means for varying the effective leverage of the system and permitting the opposing torques to be brought to actual equilibrium for the prevailing speed ratio of the device under test, a pointer responsive to changes in the effective leverage of the system, and scale means indicating the correct adjustment of the leverage system under which the torques should theoretically be in equilibrium for the prevailing speed ratio, said scale means through the pointer measuring the efficiency of the device under test by the difference between said correct adjustment of the leverage system and the adjustment of the leverage system for actual equilibrium between the opposing torques.

10. Measuring apparatus for determining the efficiency of speed changing drives including a common transmission system upon which the input and consequential torques of the device under test are adapted to act simultaneously and be compared, means for adjusting said system to the transmission ratio of the drive, and indicating means for the system directly reading the torque loss in the device under test.

11. Measuring apparatus for determining the efficiency of speed changing drives including a common transmission system upon which the input and consequential torques of the device under test are adapted to act simultaneously and be compared, means for varying the transmission ratio of the system to equilibrium for the transmission ratio of the drive, and means for measuring the variation of the system and directly indicating the efficiency of the drive under test.

12. Measuring apparatus for determining the efficiency of speed changing drives including a common transmission leverage system upon which the input and consequential torques of the device under test are adapted to act simultaneously and be compared, means for adjusting the system to the transmission ratio of the drive under test, separate means for adjusting the lever ratio to equilibrium, and means responsive to adjustment of the system for indicating the torque loss occurring in the drive.

13. Measuring apparatus for determining the efficiency of speed changing drives including a common transmission system upon which the input and consequential torques of the device under test are adapted to act simultaneously and be compared, common means for adjusting the lever system to the transmission ratio of the drive and for adjusting the lever system to equilibrium, and means responsive to the lever system for indicating the torque loss occurring in the drive.

14. Measuring apparatus for determining the efficiency of speed changing drives including a common transmission system upon which the input and consequential torques of the device under test are adapted to act simultaneously and be compared, means for adjusting the lever system to the transmission ratio of the drive, means for automatically maintaining the lever system in equilibrium, and means responsive to the lever system for indicating the torque loss occurring in the drive.

15. Measuring apparatus for determining the efficiency of speed changing drives including a common transmission system upon which the input and consequential torques of the device under test are adapted to act simultaneously and be compared, means for adjusting the lever system to different transmission ratios, indicating means showing when the lever system is adjusted to the prevailing transmission ratio of the drive under test, means for adjusting the lever system to equilibrium, and indicating means responsive to the lever system directly reading the torque loss in the device under test.

16. Measuring apparatus for determining the efficiency of speed changing drives including a common transmission system upon which the input and consequential torques of the device under test are adapted to act simultaneously and be compared, means for adjusting the lever system to different transmission ratios, indicating means showing when the lever system is adjusted to the prevailing transmission ratio of the drive under test, means for adjusting the lever system to equilibrium, and a second indicating means responsive to the lever system for directly reading the efficiency of the device under test and serving for all transmission ratios.

17. Measuring apparatus for determining the efficiency of speed changing drives including a common transmission system upon which the input and consequential torques of the device under test are adapted to act simultaneously and be compared, means for adjusting the lever system to different transmission ratios, a scale indicating when the lever system is adjusted to the prevailing transmission ratio of the drive under test, means for adjusting the lever system to equilibrium, and a second scale measuring the efficiency of the test drive for the prevailing transmission ratio, and being interchangeable with other scales for different transmission ratios.

18. Measuring apparatus for determining the efficiency of speed changing drives including a common transmission system upon which the input and consequential torques of the device under test are adapted to act simultaneously and be compared, means for adjusting the lever system to equilibrium, a pointer responsive to adjustment of the lever system, a rotatable cylinder having inscribed thereon a series of lines constituting a scale for reading off the efficiency of different transmission ratios, said cylinder being rotatable to bring the particular efficiency scale corresponding to the prevailing transmission in the test drive into proper relation with the indicating pointer.

19. Apparatus for measuring the efficiency of speed changing drives comprising a pair of levers, means for transmitting the torque input of the drive under test to one of said levers, means for transmitting the consequential torque developed by the drive to the other lever, means causing said levers to act against each other under the torques transmitted, means operative upon said levers to vary the lever transmission ratio to bring about equilibrium, and indicating means for measuring the difference between the torques for the prevailing speed ratio of the device under test.

20. Apparatus for measuring the efficiency of speed changing drives comprising a pair of double levers opposing at their inner ends, means for applying the input torque of the device under test to the outer end of one lever, means for transmitting the consequential torque developed by the device to the outer end of the second lever, fulcrums for each of the levers, means for adjusting the transmission ratio between the levers, and indicating means for measuring the differences between the opposing torques for the prevailing transmission ratio of the drive.

21. Apparatus for measuring the efficiency of speed changing devices comprising a pair of pivoted levers extending in side by side spaced relation, means for applying to the respective levers the torque input to the drive to be tested and the counter-torque developed by the drive, an oscillatable lever resting at its opposite ends on said torque levers and having a transverse pivot permitting relative movement between the torque levers, said oscillatable lever being supported to swing about a vertical axis extending perpendicularly between the torque levers to adjust the transmission ratio of the torque levers to equilibrium, and indicating means responsive to adjustment of the lever transmission ratio for measuring the torque loss in the drive under test.

HUBERT FRH. v. THÜNGEN.